(12) United States Patent
Li et al.

(10) Patent No.: US 12,200,760 B2
(45) Date of Patent: Jan. 14, 2025

(54) METHOD FOR SHARING CHANNEL OCCUPANCY TIME AND DEVICE

(71) Applicant: VIVO MOBILE COMMUNICATION CO., LTD., Guangdong (CN)

(72) Inventors: Can Li, Guangdong (CN); Xiaodong Shen, Guangdong (CN); Lei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 657 days.

(21) Appl. No.: 17/483,926

(22) Filed: Sep. 24, 2021

(65) Prior Publication Data

US 2022/0015144 A1  Jan. 13, 2022

Related U.S. Application Data

(63) Continuation of application No. PCT/CN2019/128534, filed on Dec. 26, 2019.

(30) Foreign Application Priority Data

Mar. 25, 2019 (CN) .......................... 201910228980.3

(51) Int. Cl.
  *H04W 72/00* (2023.01)
  *H04W 74/0808* (2024.01)
(52) U.S. Cl.
  CPC .............................. *H04W 74/0808* (2013.01)
(58) Field of Classification Search
  CPC . H04W 74/0808; H04W 72/21; H04W 16/14; H04W 72/0446; H04W 74/0875;
  (Continued)

(56) References Cited

U.S. PATENT DOCUMENTS

2017/0280475 A1  9/2017  Yerramalli et al.
2018/0035311 A1  2/2018  Yang et al.
(Continued)

FOREIGN PATENT DOCUMENTS

CN  105992345 A  10/2016
CN  106851839 A  6/2017
(Continued)

OTHER PUBLICATIONS

LG Electronics, "Discussion on AUL-initiated COT sharing for Laa", 3GPP TSG RAN WG1 Meeting #94, R1-1808464, Gothenburg, Sweden, Aug. 20-24, 2018 (Year: 2018).*
(Continued)

*Primary Examiner* — Lan-Huong Truong
(74) *Attorney, Agent, or Firm* — Price Heneveld LLP (57) ABSTRACT

Embodiments of this disclosure disclose a method for sharing a channel occupancy time and a device. The method includes: determining uplink control information UCI, where the UCI includes first indication information, the first indication information is used to enable a network device to determine related information about downlink transmission in a target time period, a terminal device shares a target channel occupancy time COT in the target time period with the network device, and the target COT is obtained by the terminal device based on listen before talk LBT; and transmitting the UCI.

18 Claims, 3 Drawing Sheets

Receive uplink control information UCI, where the UCI includes first indication information, the first indication information is used by a network device to determine related information about downlink transmission in a target time period, the network device shares a target channel occupancy time COT in the target time period with a terminal device, and the target COT is obtained by the terminal device based on listen before talk LBT — S210

Determine the related information based on the first indication information — S220

(58) Field of Classification Search
CPC ... H04L 5/0044; H04L 5/0053; H04L 5/0094; H04L 27/0006

See application file for complete search history.

(56) References Cited

U.S. PATENT DOCUMENTS

| | | | |
|---|---|---|---|
| 2018/0227936 | A1 | 8/2018 | Yerramalli et al. |
| 2019/0159137 | A1* | 5/2019 | Zhang .................. H04W 52/146 |
| 2019/0208540 | A1 | 7/2019 | Kim et al. |
| 2019/0342915 | A1 | 11/2019 | Kim et al. |
| 2021/0160867 | A1* | 5/2021 | Tang ...................... H04L 1/1896 |
| 2022/0078834 | A1* | 3/2022 | Wu ...................... H04L 27/0006 |

FOREIGN PATENT DOCUMENTS

| | | |
|---|---|---|
| CN | 108366431 A | 8/2018 |
| CN | 108781471 A | 11/2018 |
| WO | 2017126935 A1 | 7/2017 |
| WO | 2018173004 A1 | 9/2018 |
| WO | 2018184022 A1 | 10/2018 |
| WO | 2019027297 A1 | 2/2019 |

OTHER PUBLICATIONS

Nokia, "Work Item on Enhancements to LTE operation in unlicensed spectrum", 3GPP TSG RAN meeting #79, RP-180362, Chennai, India, Mar. 19-22, 2018 (Year: 2018).*

Intel Corporation, "Enhancements to configured grants for NR-unlicensed", 3GPP TSG RAN WG1 Meeting AH 1901, R1-1900473, Taipei, Taiwan, Jan. 2019, 7 pages (Year: 2019).*

Huawei, "Feature lead summary of HARQ enhancement in NR-U", 3GPP TSG RAN WGI Meeting #95, RI-1813981.

Nokia, "Work Item on Enhancements to LTE operation in unlicensed spectrum", 3GPP TSG RAN meeting #79, RP-180362, Chennai, India, Mar. 19-22, 2018.

LG Electronics, "Discussion on AUL-initiated COT sharing for Laa", 3GPP TSG RAN WG1 Meeting #94, R1-1808464, Gothenburg, Sweden, Aug. 20-24, 2018.

VIVO, "Outcome of offline discussion on Configured grant enhancement", 3GPP TSG RAN WG1#96, R1-1903476, Athens, Greece, Feb. 25-Mar. 1, 2019.

Intel Corporation, "Summary of offline discussions configured grants for NR-U", 3GPP TSG RAN WG1 Meeting #95, R1-1814121, Spokane, USA, Nov. 12-16, 2018.

Nokia, "Feature Lead's Summary on Channel Access Procedures", 3GPP TSG RAN WG1#94bis, R1-1811959, Chengdu, China, Oct. 8-12, 2018.

Ericsson, "Configured UL grant for NR-U", 3GPP TSG-RAN WG1 Meeting #95, R1-1813461, Spokane, USA, Nov. 12-16, 2018.

Huawei, Hisilicon, "Coexistence and channel access for NR unlicensed band operations", 3GPP TSG RAN WG1 Ad-Hoc Meeting 1901, R1-1900060, Taipei, Jan. 21-25, 2019.

* cited by examiner

METHOD FOR SHARING CHANNEL OCCUPANCY TIME AND DEVICE

CROSS-REFERENCE TO RELATED APPLICATIONS

This application is a continuation application of International Application No. PCT/CN2019/128534 filed on Dec. 26, 2019, which claims priority to Chinese Patent Application No. 201910228980.3, filed in China on Mar. 25, 2019, which are incorporated herein by reference in their entireties.

TECHNICAL FIELD

This application relates to the field of communications technologies, and more specifically, to a method for sharing a channel occupancy time and a device.

BACKGROUND

In a new radio (NR) system, a terminal device or a network device needs to perform, before transmitting information in an unlicensed band, clear channel assessment (CCA)/extended clear channel assessment (eCCA) for channel access, or energy detection (ED). Transmission cannot be started before a channel is determined to be idle when energy is less than the ED threshold. Because an unlicensed band is shared by a plurality of technologies or transmission nodes, this contention-based access mode causes uncertainty about when a channel is available. There are mainly three categories of listen before talk (LBT) for use in NR unlicensed communications in the related art: LBT category 1 (Cat 1), where the transmission is performed without any CCA, and this category can be used only in a case that a channel has been accessed and that a transmission switching gap is less than 16 µs; LBT Cat 2, where 25 µs channel access is performed, and this category can be used for accessing channels for specific signals, with a maximum continuous transmission duration less than a specified value, such as 1 ms; and LBT Cat 4, where channel access with random back-off is performed, and for different priorities, parameter settings are different and Maximum Channel Occupancy Time after a channel is obtained are also different.

The network device may share a channel occupancy time (COT) obtained by the terminal device with configured grant transmission. However, there is no clear solution how the network device shares a COT for downlink information transmission, which affects effectiveness of communication.

SUMMARY

An objective of embodiments of this disclosure is to provide a method for sharing a channel occupancy time and a device, to resolve a problem of a lack of a clear solution to how a network device shares a COT for downlink information transmission, which affects effectiveness of communication.

To resolve the problem above, the embodiments of this disclosure are implemented as follows.

According to a first aspect, a method for sharing a channel occupancy time is provided. The method includes:
  determining uplink control information UCI, where the UCI includes first indication information, the first indication information is used to enable a network device to determine related information about downlink transmission in a target time period, a terminal device shares a target channel occupancy time COT in the target time period with the network device, and the target COT is obtained by the terminal device based on listen before talk LBT; and
  transmitting the UCI.

According to a second aspect, a method for sharing a channel occupancy time is provided. The method includes:
  receiving uplink control information UCI, where the UCI includes first indication information, the first indication information is used to enable a network device to determine related information about downlink transmission in a target time period, the network device shares a target channel occupancy time COT in the target time period with a terminal device, and the target COT is obtained by the terminal device based on listen before talk LBT; and
  determining the related information based on the first indication information.

According to a third aspect, a terminal device is provided, including:
  a processing module, configured to determine uplink control information UCI, where the UCI includes first indication information, the first indication information is used to enable a network device to determine related information about downlink transmission in a target time period, the terminal device shares a target channel occupancy time COT in the target time period with the network device, and the target COT is obtained by the terminal device based on listen before talk LBT; and
  a transceiver module, configured to transmit the UCI.

According to a fourth aspect, a network device is provided, including:
  a transceiver module, configured to receive uplink control information UCI, where the UCI includes first indication information, the first indication information is used to enable the network device to determine related information about downlink transmission in a target time period, a terminal device shares a target channel occupancy time COT in the target time period with the network device, and the target COT is obtained by the terminal device based on listen before talk LBT; and
  a processing module, configured to determine the related information based on the first indication information.

According to a fifth aspect, a terminal device is provided, including: a processor, a memory, and a computer program stored in the memory and executable on the processor. When the computer program is executed by the processor, the steps of the method according to the first aspect are implemented.

According to a sixth aspect, a network device is provided, including: a processor, a memory, and a computer program stored in the memory and executable on the processor. When the computer program is executed by the processor, the steps of the method according to the second aspect are implemented.

According to a seventh aspect, a computer-readable storage medium is provided, where the computer-readable storage medium stores a computer program, and when the computer program is executed by a processor, the steps of the method according to the first aspect are implemented.

According to an eighth aspect, a computer-readable storage medium is provided. The computer-readable storage medium stores a computer program, and when the computer program is executed by a processor, the steps of the method according to the second aspect are implemented.

In the embodiments of this disclosure, the terminal device adds, to the UCI, the first indication information used to enable the network device to determine related information about downlink transmission in a time period of a shared target COT, so that the network device can perform downlink transmission based on the determined related information about downlink transmission. Therefore, the network device and the terminal device have a consistent understanding on downlink transmission, thereby improving effectiveness of communication.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure shall fall within the protection scope of this disclosure.

The technical solutions of this disclosure can be applied to various communications systems, such as a long term evolution (LTE)/long term evolution-advanced (LTE-A) system and a new radio (NR) system.

A terminal device (User Equipment, UE) in the embodiments of this disclosure, also referred to as a mobile terminal, a mobile user device, or the like, may communicate with one or more core networks through a radio access network (such as Radio Access Network, RAN). The user equipment may be a mobile terminal, such as a mobile phone (also referred to as a "cellular" phone) and a computer with a mobile terminal, for example, a portable, pocket-sized, handheld, computer built-in, or in-vehicle mobile apparatus, which exchanges voice and/or data with the radio access network.

In some embodiments of this disclosure, a network device is an apparatus deployed in a radio access network device to provide radio communication functions for terminal devices. For example, the network device may be a base station, and the base station may be an evolved base station (eNB or e-NodeB, evolvedNode B) in LTE and a 5G base station (gNB), or a subsequent evolved network-side device. This disclosure is not limited thereto.

The technical solutions provided in the embodiments of this disclosure are described in detail below with reference to the accompanying drawings.

Figure 1:
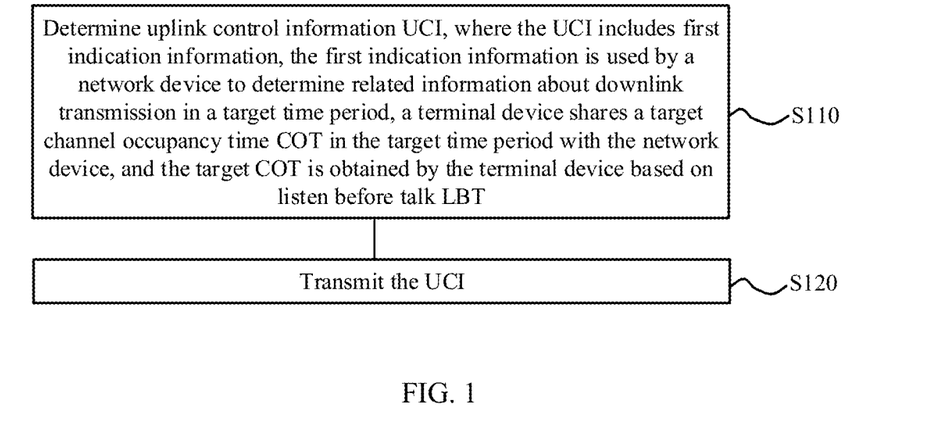
FIG. 1 is a schematic flowchart of a method for sharing a channel occupancy time according to an embodiment of this disclosure.

FIG. 1 shows a method for sharing a channel occupancy time according to an embodiment of this application. The method shown in FIG. 1 is performed by a terminal device. As shown in FIG. 1, the method includes the following steps.

S110. Determine uplink control information (UCI), where the UCI includes first indication information, the first indication information is used to enable a network device to determine related information about downlink transmission in a target time period, the terminal device shares a target channel occupancy time COT in the target time period with the network device, and the target COT is obtained by the terminal device based on listen before talk LBT.

It can be understood that the target COT is obtained by the terminal device based on the listen before talk LBT. In other words, the target COT is actually an unlicensed resource.

Optionally, in some embodiments, the related information in S110 includes a type of downlink transmission information, and the first indication information is used to indicate the type of downlink transmission information.

For example, the UCI includes a 1-bit field (which can be named, for example, Allow Sharing Type field), and this field carries the first indication information. When a value of this field is "0", it means that the first indication information indicates that the type of downlink transmission information is control information. When a value of this field is "1", it means that the first indication information indicates that the type of downlink transmission information includes control information and data information. Herein, if the type of downlink transmission information is control information, the network device can transmit only a physical downlink control channel (PDCCH) in the target time period. If the type of downlink transmission information includes control information and data information, the network device can transmit a PDCCH and a physical downlink shared channel (PDSCH) in the target time period.

The terminal device may determine the type of downlink transmission information according to a channel access priority class used when the terminal device obtains the target COT based on LBT. A larger value of the channel access priority class indicates a lower priority of a service. On a basis of this, the method shown in FIG. 1 further includes: determining the type of downlink transmission information according to the channel access priority class used when the terminal device obtains the target COT based on LBT.

Specifically, in some embodiments, if the channel access priority class used when the terminal device obtains the target COT based on LBT is a target channel access priority class, it is determined that the type of downlink transmission information includes control information and data information; or if the channel access priority class used when the terminal device obtains the target COT based on LBT belongs to other channel access priority classes than the target channel access priority class, it is determined that the type of downlink transmission information includes control information. The target channel access priority class is higher than any one of the other channel access priority classes.

In other words, if the channel access priority class used when the terminal device obtains the target COT based on LBT is a highest channel access priority class (for example, channel access priority class 4), indicating a lowest service priority, it is determined that the type of downlink transmission information includes control information and data information. For example, the value of the Allow Sharing Type field in the foregoing example can be set to "1". If the channel access priority class used when the terminal device obtains the target COT based on LBT is not the highest channel access priority class, it is determined that the type of downlink transmission information includes control information. For example, the value of the Allow Sharing Type field in the foregoing example can be set to "0".

Optionally, in some embodiments, the related information in S110 includes a channel access priority class of downlink transmission data information, and the first indication information is used to indicate a channel access priority class used when the terminal device obtains the target COT based on LBT.

In other words, a type of information transmitted by the network device during downlink transmission in the target time period is not limited. However, if the network device wants to transmit data information in the target time period, the network device needs to determine the channel access priority class satisfied by the downlink transmission data information. Only data information with a channel access priority class lower than the channel access priority class determined by the network device can be transmitted in the target time period. In other words, only data information with a corresponding service priority higher than a service priority determined by the network device can be transmitted in the target time period.

For example, if the channel access priority class used when the terminal device obtains the target COT based on LBT is 3, a channel access priority class of data information to be transmitted by the network device in the target time period needs to be lower than 3, for example, 2 or 1, which means a higher service priority.

S120. Transmit the UCI.

On a basis of the foregoing embodiment, the UCI in S110 further includes second indication information, the second indication information is used to indicate whether the network device schedules uplink transmission of the terminal device in a remaining time period of the target COT, and the remaining time period is a time period between an end time of the target time period and an end time of the target COT. By means of indicating whether the network device schedules the uplink transmission of the terminal device in the remaining time period, the network device and the terminal device have a consistent understanding on allocation of the remaining time period of the target COT, thereby further improving effectiveness of communication.

Further, the UCI is carried on a target PUSCH, the second indication information indicates that the network device schedules the uplink transmission of the terminal device in the remaining time period of the target COT, the UCI further includes third indication information, and the third indication information is used to enable the network device to determine the end time of the target COT.

In an example, the third indication information is used to indicate duration between a transmission end time of the target PUSCH and the end time of the target COT. In this case, the network device may detect the transmission end time of the target PUSCH, and the network device may determine the end time of the target COT based on the detected transmission end time of the target PUSCH and the duration indicated by the third indication information.

Alternatively, the third indication information is used to indicate the end time of the target COT. In this case, the network device may directly determine the end time of the target COT based on the third indication information. For example, the third indication information indicates an index of a slot corresponding to the end time of the target COT, or the third indication information indicates an index of a symbol corresponding to the end time of the target COT.

Optionally, in some embodiments, the UCI in S110 further includes fourth indication information, and the fourth indication information is used to indicate one of the following parameters: duration of the target time period; a start time and duration of the target time period; or a start time and an end time of the target time period.

For example, the fourth indication information indicates the duration of the target time period. In this case, the start time of the target time period may be predefined. For example, the start time may be an end time of a configured grant resource of the terminal device, or the start time may be a transmission end time of a PUSCH carrying the UCI.

Alternatively, the fourth indication information indicates the start time and the duration of the target time period, and the start time of the target time period herein may be configured by using a value of an offset relative to the transmission end time (or a transmission start time) of the PUSCH carrying the UCI. In other words, the fourth indication information may indirectly indicate the start time of the target time period by indicating the value of the offset.

Alternatively, the fourth indication information indicates the start time and the end time of the target time period, and the start time and the end time of the target time period herein may be configured by using a value of an offset relative to the transmission end time (or a transmission start time) of the PUSCH carrying the UCI. In other words, the fourth indication information may indirectly indicate the start time and the end time of the target time period by indicating the value of the offset.

A time granularity of the value of the offset or the duration and a multiple of the time granularity may be configured by using radio resource control (RRC) signaling. The UCI dynamically indicates one of a plurality of configured time granularities and one of a plurality of multiples.

It can be understood that if the terminal device does not allow the network device to share the target COT, the fourth indication information may be used to indicate that the duration of the target time period is 0, or indicate that the start time and the end time of the target time period are the same.

The method for sharing a channel occupancy time according to an embodiment of this disclosure is described in detail above from the perspective of the terminal device side with reference to FIG. 1, and a method for sharing a channel occupancy time according to another embodiment of this disclosure is described in detail below from the perspective of a network device side with reference to FIG. 2. It should be noted that interaction between a terminal device and a network device described from the perspective of the network device side is the same as that described from the perspective of the terminal device side, and therefore relevant description is appropriately omitted to avoid repetition.

Figure 2:
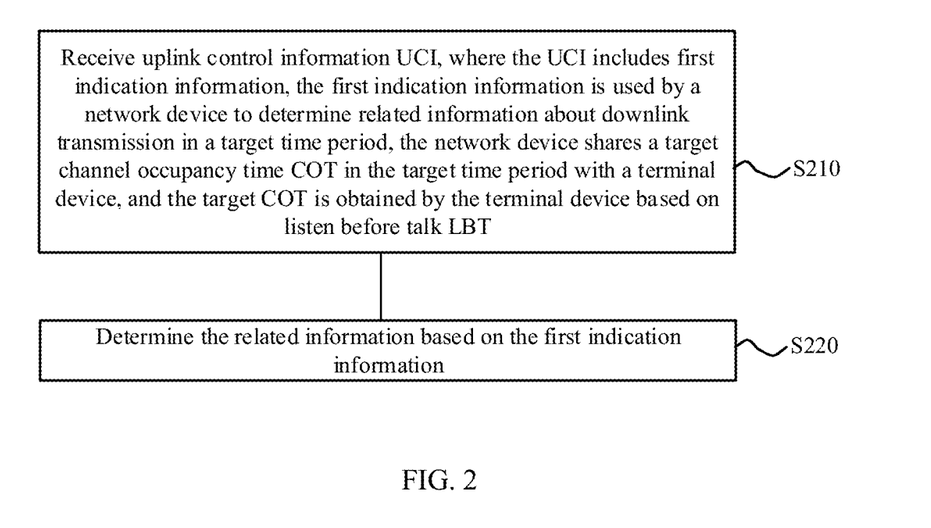
FIG. 2 is a schematic flowchart of a method for sharing a channel occupancy time according to another embodiment of this disclosure.

FIG. 2 is a schematic flowchart of a method for sharing a channel occupancy time according to another embodiment of this disclosure. The method shown in FIG. 2 can be performed by a network device. As shown in FIG. 2, the method includes the following steps.

S210. Receive uplink control information UCI, where the UCI includes first indication information, the first indication information is used to enable the network device to determine related information about downlink transmission in a target time period, the network device shares a target channel occupancy time COT in the target time period with a terminal device, and the target COT is obtained by the terminal device based on listen before talk LBT.

S220. Determine the related information based on the first indication information.

Optionally, in some embodiments, the related information in S210 includes a type of downlink transmission information, and the first indication information is used to indicate the type of downlink transmission information. Correspondingly, the determining the related information based on the first indication information S220 includes: determining that the type of downlink transmission information is the type indicated by the first indication information.

Optionally, in some embodiments, the related information in S210 includes a channel access priority class of downlink transmission data information, and the first indication information is used to indicate a channel access priority class used when the terminal device obtains the target COT based on LBT. Correspondingly, the determining the related information based on the first indication information in S220 includes: determining that the channel access priority class satisfied by the downlink transmission data information is the channel access priority class indicated by the first indication information. To be specific, only data information with a channel access priority class lower than the channel access priority class indicated by the first indication information can be possibly transmitted in the target time period.

For example, if the channel access priority class used when the terminal device obtains the target COT based on LBT is 3 (the channel access priority class indicated by the first indication information is 3), a channel access priority class of data information transmitted by the network device in the target time period needs to be lower than 3, for example, 2 or 1.

Optionally, in some embodiments, the UCI further includes second indication information, and the second indication information is used to indicate whether the network device schedules uplink transmission of the terminal device in a remaining time period of the target COT. The method shown in FIG. 2 further includes: if the second indication information indicates that the network device schedules the uplink transmission of the terminal device in the remaining time period of the target COT, scheduling the uplink transmission of the terminal device in the remaining time period. The remaining time period is a time period between an end time of the target time period and an end time of the target COT.

In an example, it may be agreed in advance that if the terminal device allows the network device to share the target COT, duration between the end time of the target time period and the end time of the target COT is preset duration. In this case, the network device can directly determine the remaining time period based on the agreement.

Optionally, in some embodiments, the UCI is carried on a target physical uplink shared channel PUSCH, the second indication information indicates that the network device schedules the uplink transmission of the terminal device in the remaining time period of the target COT, the UCI further includes third indication information, and the third indication information is used to enable the network device to determine the end time of the target COT. The method shown in FIG. 2 further includes: determining the remaining time period based on the third indication information and the target time period.

Specifically, the network device determines the time period between the end time of the target time period and the end time of the target COT as the remaining time period.

Optionally, in some embodiments, the third indication information is used to indicate duration between a transmission end time of the target PUSCH and the end time of the target COT. In this case, the network device may detect transmission end time of the target PUSCH, and the network device may determine the end time of the target COT based on the detected transmission end time of the target PUSCH and the duration indicated by the third indication information.

Optionally, in some embodiments, the third indication information is used to indicate the end time of the target COT. In this case, the network device may directly determine the end time of the target COT based on the third indication information. For example, the third indication information indicates an index of a slot corresponding to the end time of the target COT, or the third indication information indicates an index of a symbol corresponding to the end time of the target COT.

Optionally, in some embodiments, the UCI further includes fourth indication information, and the fourth indication information is used to indicate one of the following parameters: duration of the target time period; a start time and duration of the target time period; or a start time and an end time of the target time period. The method shown in FIG. 2 further includes: determining the target time period based on the fourth indication information.

For example, the fourth indication information indicates the duration of the target time period. In this case, the start time of the target time period may be predefined. For example, the start time may be an end time of a configured grant resource of the terminal device, or the start time may be a transmission end time of a PUSCH carrying the UCI. If the start time of the target time period is the transmission end time of PUSCH, and the duration indicated by the fourth indication information is 3 ms, the network device determines that the target time period is a time period from time t to time t+3, where the time t is the transmission end time of the PUSCH.

Alternatively, the fourth indication information indicates the start time and the duration of the target time period, and the start time of the target time period herein may be configured by using a value of an offset relative to the transmission end time (or a transmission start time) of the PUSCH carrying the UCI. In other words, the fourth indication information may indirectly indicate the start time of the target time period by indicating the value of the offset. If the start time of the target time period is configured by using a value of an offset relative to the transmission end time of the PUSCH, a value of an offset indicated by the fourth indication information is 1 ms, and the duration is 3 ms, the network device determines that the target time period is a time period from time t+1 to t+4. t is the transmission end time of the PUSCH.

A time granularity of the value of the offset or the duration and a multiple of the time granularity may be configured for the terminal device by using radio resource control (RRC) signaling. The UCI dynamically indicates one of a plurality of configured time granularities and one of a plurality of multiples.

The method for sharing a channel occupancy time according to an embodiment of this disclosure is described above in detail with reference to FIG. 1 and FIG. 2, and a terminal device according to an embodiment of this disclosure is described below in detail with reference to FIG. 3.

Figure 3:
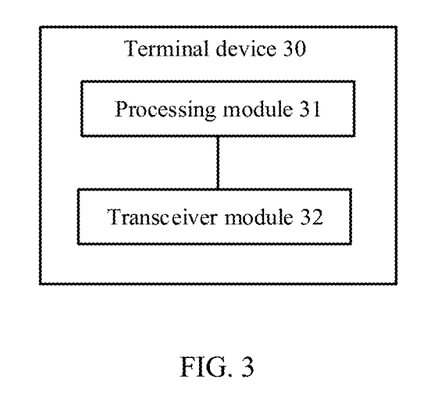
FIG. 3 is a schematic structural diagram of a terminal device according to an embodiment of this disclosure.

FIG. 3 is a schematic structural diagram of a terminal device according to an embodiment of this disclosure. As shown in FIG. 3, the terminal device 30 includes:

a processing module 31, configured to determine uplink control information UCI, where the UCI includes first indication information, the first indication information is used to enable a network device to determine related information about downlink transmission in a target time period, the terminal device shares a target channel occupancy time COT in the target time period with the network device, and the target COT is obtained by the terminal device based on listen before talk LBT; and a transceiver module 32, configured to transmit the UCI.

Optionally, in an embodiment, the related information includes a type of downlink transmission information, and the first indication information is used to indicate the type of downlink transmission information.

Optionally, in an embodiment, the processing module 31 is further configured to:

determine the type of downlink transmission information according to a channel access priority class used when the terminal device obtains the target COT based on LBT.

Optionally, in an embodiment, the processing module 31 is specifically configured to:

if the channel access priority class used when the terminal device obtains the target COT based on LBT is a target channel access priority class, determine that the type of downlink transmission information includes control information and data information; or if the channel access priority class used when the terminal device obtains the target COT based on LBT belongs to other channel access priority classes than the target channel access priority class, determine that the type of downlink transmission information includes control information, where the target channel access priority class is higher than any one of the other channel access priority classes.

Optionally, in an embodiment, the related information includes a channel access priority class of downlink transmission data information, and the first indication information is used to indicate a channel access priority class used when the terminal device obtains the target COT based on LBT.

Optionally, in an embodiment, the UCI further includes second indication information, the second indication information is used to indicate whether the network device schedules uplink transmission of the terminal device in a remaining time period of the target COT, and the remaining time period is a time period between an end time of the target time period and an end time of the target COT.

Optionally, in an embodiment, the UCI is carried on a target physical uplink shared channel PUSCH, the second indication information indicates that the network device schedules the uplink transmission of the terminal device in the remaining time period of the target COT, the UCI further includes third indication information, and the third indication information is used to enable the network device to determine the end time of the target COT.

Optionally, in an embodiment, the third indication information is used to indicate duration between a transmission end time of the target PUSCH and the end time of the target COT; or the third indication information is used to indicate the end time of the target COT.

Optionally, in an embodiment, the UCI further includes fourth indication information, and the fourth indication information is used to indicate one of the following parameters: duration of the target time period; a start time and duration of the target time period; or a start time and an end time of the target time period.

The terminal device provided in this embodiment of this disclosure can implement the processes implemented by the terminal device in the method embodiment in FIG. 1, and details are not described here again to avoid repetition.

Figure 4:
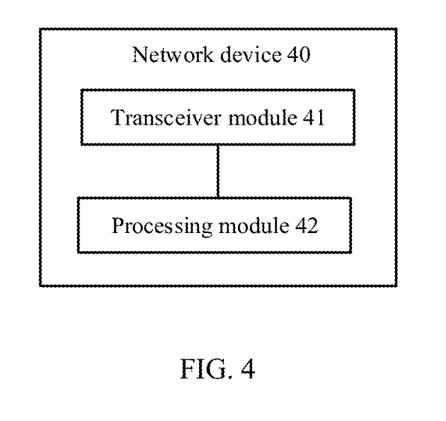
FIG. 4 is a schematic structural diagram of a network device according to an embodiment of this disclosure.

FIG. 4 is a schematic structural diagram of a network device according to an embodiment of this disclosure. As shown in FIG. 4, the network device 40 includes:

a transceiver module 41, configured to receive uplink control information UCI, where the UCI includes first indication information, the first indication information is used to enable the network device to determine related information about downlink transmission in a target time period, the network device shares a target channel occupancy time COT in the target time period with a terminal device, and the target COT is obtained by the terminal device based on listen before talk LBT; and a processing module 42, configured to determine the related information based on the first indication information.

Optionally, in an embodiment, the related information includes a type of downlink transmission information, and the first indication information is used to indicate the type of downlink transmission information; and the processing module 42 is specifically configured to:

determine that the type of downlink transmission information is the type indicated by the first indication information.

Optionally, in an embodiment, the related information includes a channel access priority class of downlink transmission data information, and the first indication information is used to indicate a channel access priority class used when the terminal device obtains the target COT based on LBT; and the processing module 42 is specifically configured to:

determine that the channel access priority class satisfied by the downlink transmission data information is the channel access priority class indicated by the first indication information.

Optionally, in an embodiment, the UCI further includes second indication information, and the second indication information is used to indicate whether the network device schedules uplink transmission of the terminal device in a remaining time period of the target COT. The processing module 42 is further configured to:

if the second indication information indicates that the network device schedules the uplink transmission of the terminal device in the remaining time period of the target COT, schedule the uplink transmission of the terminal device in the remaining time period, where the remaining time period is a time period between an end time of the target time period and an end time of the target COT.

Optionally, in an embodiment, the UCI is carried on a target physical uplink shared channel PUSCH, the second indication information indicates that the network device schedules the uplink transmission of the terminal device in the remaining time period of the target COT, the UCI further includes third indication information, and the third indication information is used to enable the network device to determine the end time of the target COT. The processing module 42 is further configured to:

determine the remaining time period based on the third indication information and the target time period.

Optionally, in an embodiment, the third indication information is used to indicate duration between a transmission end time of the target PUSCH and the end time of the target COT; or the third indication information is used to indicate the end time of the target COT.

Optionally, in an embodiment, the UCI further includes fourth indication information, and the fourth indication information is used to indicate one of the following parameters: duration of the target time period; a start time and duration of the target time period; or a start time and an end time of the target time period. The processing module 42 is further configured to:

determine the target time period based on the fourth indication information.

The network device provided in this embodiment of this disclosure can implement the processes implemented by the network device in the method embodiment in FIG. 2. Details are not described herein again to avoid repetition.

Figure 5:
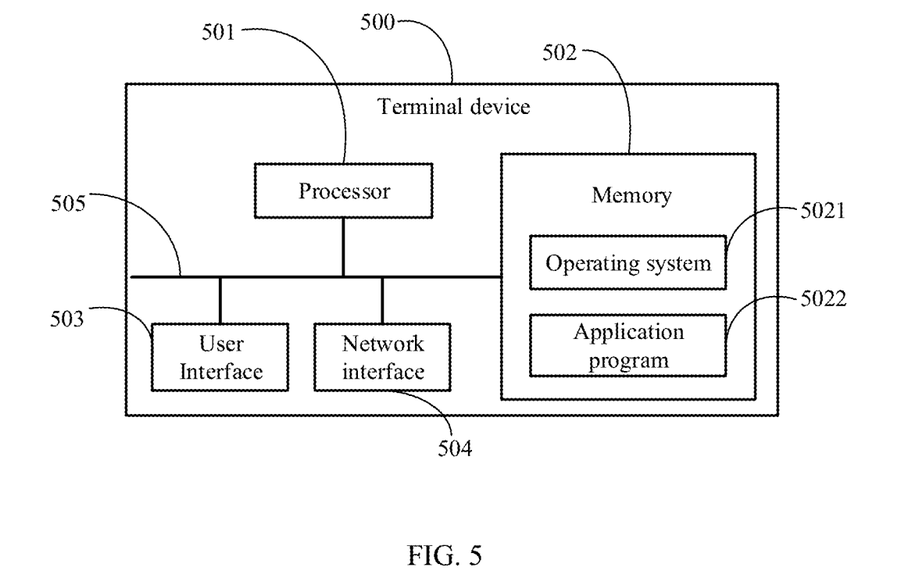
FIG. 5 is a schematic structural diagram of a terminal device according to another embodiment of this disclosure.

FIG. 5 is a block diagram of a terminal device according to another embodiment of this disclosure. The terminal device 500 shown in FIG. 5 includes at least one processor 501, a memory 502, a user interface 503, and at least one network interface 504. The components in the terminal device 500 are coupled together through a bus system 505. It can be understood that the bus system 505 is configured to implement connection and communication between these components. In addition to a data bus, the bus system 505 further includes a power bus, a control bus, and a status signal bus. However, for clarity of description, various buses are demoted as the bus system 505 in FIG. 5.

The user interface 503 may include a display, a keyboard, a pointing device (for example, a mouse or a trackball), a touch panel or a touchscreen, or the like.

It can be understood that the memory 502 in this embodiment of this disclosure may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 502 of the system and the method described in the embodiments of this disclosure is intended to include but not be limited to these and any other applicable types of memories.

In some embodiments, the memory 502 stores the following elements: executable modules or data structures, or a subset thereof, or an extended set thereof: an operating system 5021 and an application program 5022.

The operating system 5021 includes various system programs, such as a framework layer, a core library layer, and a driver layer, for implementing various basic services and processing hardware-based tasks. The application program 5022 includes various application programs, such as a media player and a browser, which are used to implement various application services. A program for implementing the method in the embodiments of this disclosure may be included in the application program 5022.

In this embodiment of this disclosure, the terminal device 500 further includes: a computer program stored in the memory 502 and executable on the processor 501. When the computer program is executed by the processor 501, the processes of the method described above with reference to FIG. 1 are implemented, with the same technical effects achieved. To avoid repetition, details are not described herein again.

The method disclosed in the foregoing embodiments of this disclosure may be applied to the processor 501 or implemented by the processor 501. The processor 501 may be an integrated circuit chip, having a signal processing capability. During implementation, the steps of the foregoing method may be completed by hardware integrated logic circuits in the processor 501 or instructions in the form of software. The foregoing processor 501 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 502, and the processor 501 fetches information in the memory 502, and completes the steps of the foregoing method in combination with its hardware. Specifically, the computer-readable storage medium stores a computer program, where when the computer program is executed by the processor 501, the steps in the method embodiment described above with reference to FIG. 1 are implemented.

It can be understood that the embodiments described in the embodiments of this disclosure may be implemented by hardware, software, firmware, middleware, microcode, or a combination thereof. In implementation by hardware, a processing unit may be implemented in one or more application-specific integrated circuits (ASIC), digital signal processors (DSP), digital signal processing devices (DSP Device, DSPD), programmable logic devices (PLD), field programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside or outside the processor.

Figure 6:
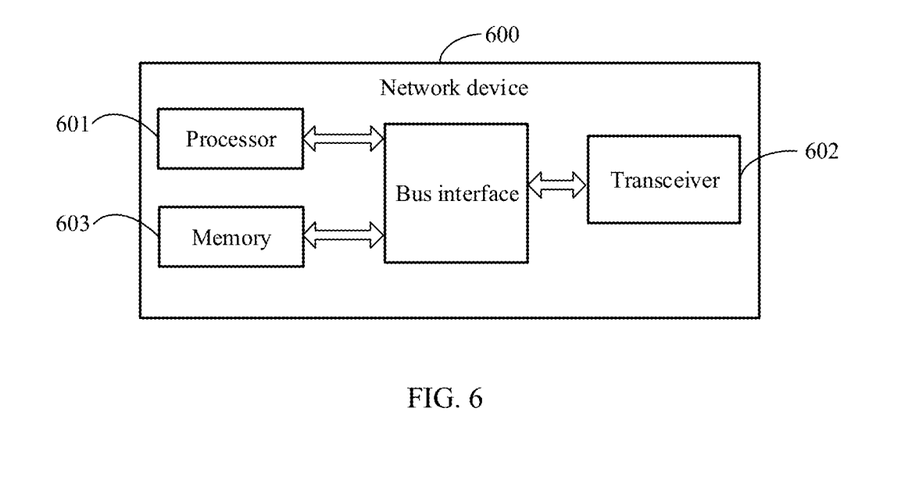
FIG. 6 is a schematic structural diagram of a network device according to another embodiment of this disclosure.

FIG. 6 is a schematic structural diagram of a network device according to another embodiment of this disclosure. As shown in FIG. 6, the network device 600 includes a processor 601, a transceiver 602, a memory 603, and a bus interface.

In this embodiment of this disclosure, the network device 600 further includes: a computer program stored in the memory 603 and executable on the processor 601, where when the computer program is executed by the processor 601, the processes of the method described above with reference to FIG. 2 are implemented, with the same technical effects achieved. To avoid repetition, details are not described herein again.

In FIG. 6, a bus architecture may include any number of interconnected buses and bridges, and specifically connect together various circuits of one or more processors represented by the processor 601 and a memory represented by the memory 603. The bus architecture may further interconnect various other circuits such as a peripheral device, a voltage regulator, and a power management circuit. These are all common sense in the art, and therefore are not further described in this specification. The bus interface provides interfaces. The transceiver 602 may be a plurality of components, including a transmitter and a receiver, and provides units for communicating with a variety of other apparatuses on a transmission medium.

The processor 601 is responsible for management of the bus architecture and general processing, and the memory 603 may store data for use by the processor 601 when the processor 601 performs an operation.

An embodiment of this disclosure further provides a computer-readable storage medium, where the computer-readable storage medium stores a computer program. When the computer program is executed by a processor, the processes of the method embodiments described above with reference to FIG. 1 and FIG. 2 are implemented, with the same technical effects achieved. Therefore, details are not described here again to avoid repetition. For example, the computer-readable storage medium is a read-only memory (ROM), a random access memory (RAM), a magnetic disk, or an optical disc.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing embodiments, persons skilled in the art can clearly understand that the method in the foregoing embodiments may be implemented by software on a necessary universal hardware platform or by hardware only. In most cases, the former is a more preferred embodiment though. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing embodiments. The foregoing embodiments are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for sharing a channel occupancy time, performed by a terminal device and comprising:
   determining uplink control information (UCI), wherein the UCI is used to indicate information enabling a network device to determine related information about downlink transmission in a target time period, the network device shares a target channel occupancy time (COT) in the target time period, and the target COT is obtained by the terminal device based on listen before talk (LBT); and
   transmitting the UCI;
   wherein the UCI is further used to indicate a start time and duration of the target time period, wherein the start time of the target time period is indicated by using a value of an offset relative to the transmission end time of the PUSCH carrying the UCI.

2. The method according to claim 1, wherein the related information comprises a type of downlink transmission information, and the UCI is used to indicate the type of downlink transmission information.

3. The method according to claim 2, further comprising:
   determining the type of downlink transmission information based on a channel access priority class used when the terminal device obtains the target COT based on LBT.

4. The method according to claim 3, wherein the determining the type of downlink transmission information according to a channel access priority class used when the terminal device obtains the target COT based on LBT comprises:
   if the channel access priority class used when the terminal device obtains the target COT based on LBT is a target channel access priority class, determining that the type of downlink transmission information comprises control information and data information; or
   if the channel access priority class used when the terminal device obtains the target COT based on LBT belongs to other channel access priority classes than the target channel access priority class, determining that the type of downlink transmission information comprises control information, wherein
   the target channel access priority class is higher than any one of the other channel access priority classes.

5. The method according to claim 1, wherein the related information comprises a channel access priority class of downlink transmission data information, and the UCI is used to indicate a channel access priority class used when the terminal device obtains the target COT based on LBT.

6. The method according to claim 1, wherein the UCI is further used to indicate whether the network device schedules uplink transmission of the terminal device in a remaining time period of the target COT, and the remaining time period is a time period between an end time of the target time period and an end time of the target COT.

7. The method according to claim 6, wherein the UCI is carried on a target physical uplink shared channel PUSCH, the UCI indicates that the network device schedules the uplink transmission of the terminal device in the remaining time period of the target COT, the UCI is further used to enable the network device to determine the end time of the target COT.

8. The method according to claim 7, wherein the UCI is used to indicate duration between a transmission end time of the target PUSCH and the end time of the target COT; or
the UCI is used to indicate the end time of the target COT.

9. A non-transitory computer-readable medium, wherein the computer-readable medium stores a computer program, and when the computer program is executed by a processor, the steps of the method for sharing a channel occupancy time according to claim 1 are implemented.

10. A method for sharing a channel occupancy time, performed by a network device and comprising:
receiving uplink control information (UCI), wherein the UCI is used to indicate information enabling the network device to determine related information about downlink transmission in a target time period, the network device shares a target channel occupancy time (COT) in the target time period, and the target COT is obtained by the terminal device based on listen before talk (LBT); and
determining the related information based on the UCI;
wherein the UCI is further used to indicate a start time and duration of the target time period, wherein the start time of the target time period is indicated by using a value of an offset relative to the transmission end time of the PUSCH carrying the UCI.

11. The method according to claim 10, wherein the related information comprises a type of downlink transmission information, and the UCI is used to indicate the type of downlink transmission information; and
the determining the related information based on the UCI comprises:
determining that the type of downlink transmission information is the type indicated by the UCI.

12. The method according to claim 10, wherein the related information comprises a channel access priority class of downlink transmission data information, and the UCI is used to indicate a channel access priority class used when the terminal device obtains the target COT based on LBT; and
the determining the related information based on the UCI comprises:
determining that the channel access priority class satisfied by the downlink transmission data information is the channel access priority class indicated by the UCI.

13. The method according to claim 10, wherein the UCI is further used to indicate whether the network device schedules uplink transmission of the terminal device in a remaining time period of the target COT, and the method further comprises:
if the UCI indicates that the network device schedules the uplink transmission of the terminal device in the remaining time period of the target COT, scheduling the uplink transmission of the terminal device in the remaining time period, wherein the remaining time period is a time period between an end time of the target time period and an end time of the target COT.

14. The method according to claim 13, wherein the UCI is carried on a target physical uplink shared channel PUSCH, the UCI indicates that the network device schedules the uplink transmission of the terminal device in the remaining time period of the target COT, the UCI is further used to enable the network device to determine the end time of the target COT; and the method further comprises:
determining the remaining time period based on the UCI and the target time period.

15. The method according to claim 14, wherein the UCI is used to indicate duration between a transmission end time of the target PUSCH and the end time of the target COT; or
the UCI is used to indicate the end time of the target COT.

16. A network device, comprising: a memory, a processor, and a computer program stored in the memory and executable on the processor, wherein when the computer program is executed by the processor, the steps of the method for sharing a channel occupancy time according to claim 10 are implemented.

17. A non-transitory computer-readable medium, wherein the computer-readable medium stores a computer program, and when the computer program is executed by a processor, the steps of the method for sharing a channel occupancy time according to claim 10 are implemented.

18. A terminal device, comprising: a memory, a processor, and a computer program stored in the memory and executable on the processor, wherein the computer program is executed by the processor to implement:
determining uplink control information (UCI), wherein the UCI is used to indicate information enabling a network device to determine related information about downlink transmission in a target time period, the network device shares a target channel occupancy time (COT) in the target time period, and the target COT is obtained by the terminal device based on listen before talk (LBT); and
transmitting the UCI;
wherein the UCI is further used to indicate a start time and duration of the target time period, wherein the start time of the target time period is indicated by using a value of an offset relative to the transmission end time of the PUSCH carrying the UCI.

* * * * *